ORRIN S. CAMP.
Improvement in Wood Encased Cans.
No. 4,650.
Reissued Nov. 28, 1871.
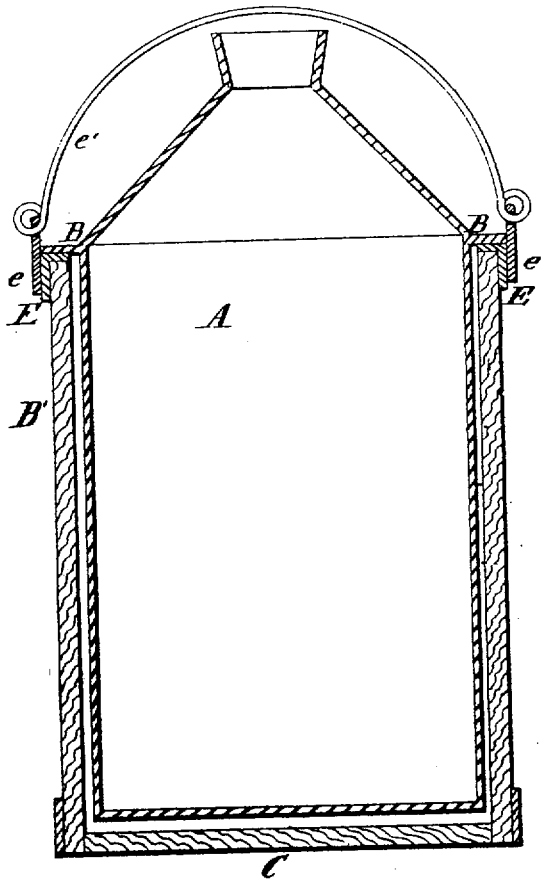
Witnesses.
F. B. Curtis,
G. E. Upham
Inventor.
O. S. Camp
Chipman & Emerson
attys,
AM. PHOTO-LITHOGRAPHIC CO. N.Y. (OSBORNE'S PROCESS.)

UNITED STATES PATENT OFFICE.

ORRIN S. CAMP, OF GRAND RAPIDS, MICHIGAN.

IMPROVEMENT IN WOOD-INCASED CANS.

Specification forming part of Letters Patent No. 118,904, dated September 12, 1871; reissue No. 4,650, dated November 28, 1871.

*To all whom it may concern:*

Be it known that I, ORRIN S. CAMP, of Grand Rapids, in the county of Kent and State of Michigan, have invented a new and valuable Improvement in Wood-Incased Metallic Vessels; and I do hereby declare that the following a full, clear, and exact description thereof, reference being had to the accompanying drawing making part of this specification, in which—

Figure 1 represents a vertical section of my invention.

This invention has for its object a novel method of connecting together a metallic can and wooden case; and it consists in providing the wooden case with a metal hoop, flanged to rest on the edge thereof, and providing the can with a flange to overlap said hoop, and then securing the two metallic surfaces together by means of solder.

Referring to the drawing, A represents the metal can, provided with a flange, B, extending outward. B′ designates the wooden case, of similar form to the can, and usually of a size just sufficient to contain the body of said can. Sometimes a little space may be left between the interior wall of the case and the can, as shown in the drawing. This case is furnished with a bottom, C, which may be fastened to the wall thereof in any suitable manner. The upper part of the case B′ is provided with a metal hoop, E, the upper edge of which is turned over and inward in such a way as to cover the edge of the wood. This hoop is secured to the case, and to it may be attached the ears *e* of a bail, *e′*, when such a handle is required.

When the metallic can is placed in its wooden case, the flange B rests on the turned edge of the hoop E, and as the two metallic surfaces are thus brought in contact they may be connected by solder, rendering the can and its case inseparable.

What I claim as my invention, and desire to secure by Letters Patent, is—

The wood-incased metal can, consisting of the can A, provided with the external horizontal flange B, and of the case B′, provided with the inwardly-flanged hoop E, covering the upper edge of the case B′, and soldered to the flange B, substantially as specified.

In testimony that I claim the above I have hereunto subscribed my name in the presence of two witnesses.

ORRIN S. CAMP.

Witnesses:

PAUL V. WASHBURN,

BENJAMIN A. HARLAN.

(136)